Patented Nov. 1, 1938

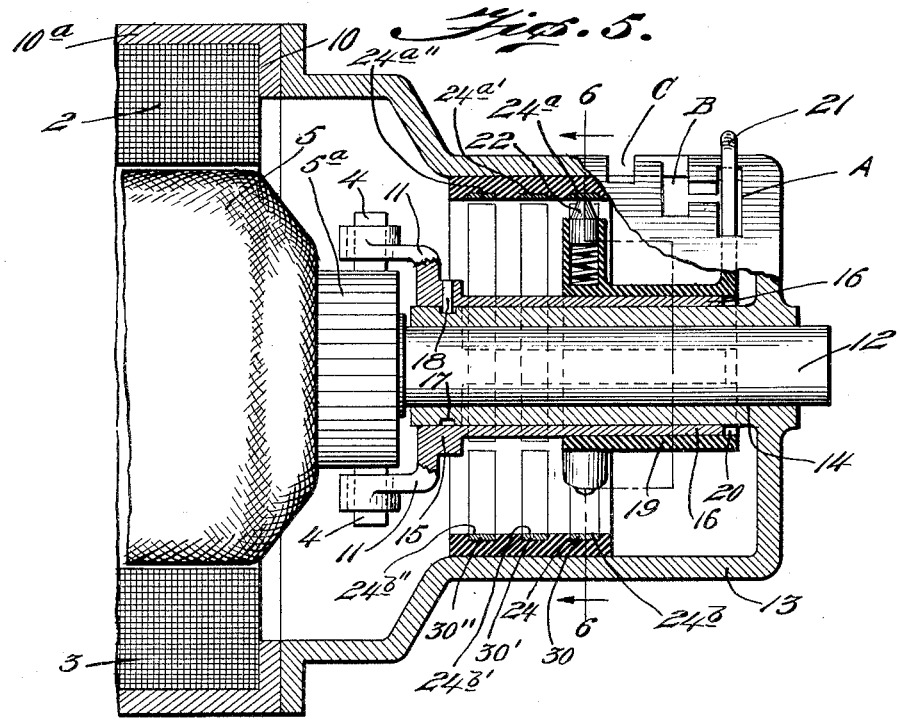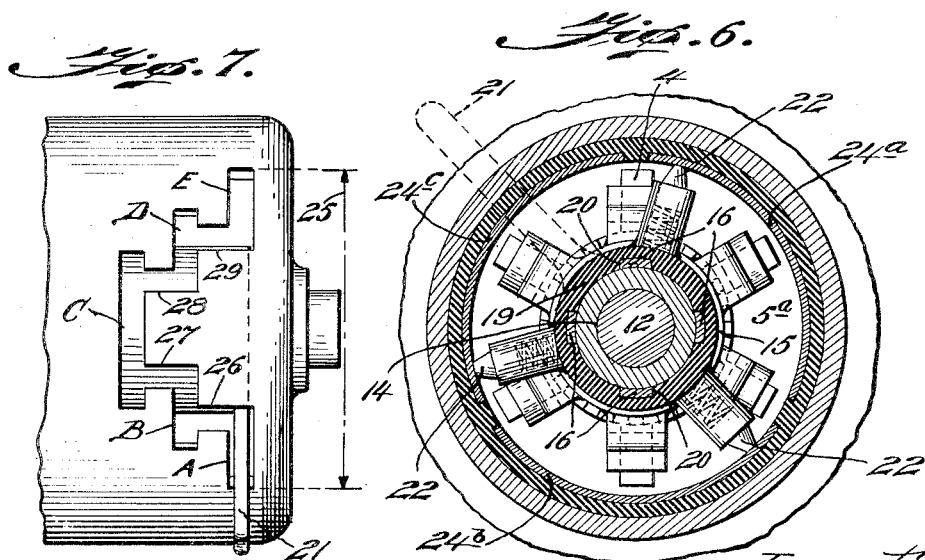

2,135,260

UNITED STATES PATENT OFFICE 2,135,260

APPARATUS FOR IMPARTING SHUNT SPEED CHARACTERISTICS TO POLYPHASE COMMUTATOR MOTORS

Austin S. Norcross, Newton, Mass.

Application July 18, 1936, Serial No. 91,302

3 Claims. (Cl. 172—276)

My invention relates to a new combination of a polyphase commutator motor and controls therefor resulting in an adjustable speed motor having shunt speed characteristics.

It has long been recognized that by controlling the phase and magnitude of the voltage impressed upon the brushes of a polyphase commutator motor that the speed and power factor may be controlled. Several arrangements have been suggested for this but all are expensive and complicated, usually requiring one or more additional machines.

My invention includes a comparatively simple and inexpensive new method of controlling the speed and power factor of such a motor by shifting brushes. To provide the desirable shunt speed characteristics, I preferably provide an auxiliary winding connected to the usual commutator brushes and I induce an auxiliary voltage in said auxiliary winding either through said primary winding or through a transformer connected to the source of power to impress through said brushes upon the armature an auxiliary voltage to function in association with the armature voltage induced from said primary to produce a resultant armature voltage to set up a current to rotate said armature so that wide variations of speed may be readily produced therein by merely shifting said brushes.

In order however to maintain suitable operating characteristics, including desirable power factor, efficiency, etc., and to prevent the motor from excessive heating at mid-speeds, I preferably divide the possible speeds into a plurality of speed ranges by varying the magnitude of the auxiliary voltage impressed upon said armature and the speed throughout each range may be varied by shifting the brushes.

I also preferably provide unitary control means for controlling and relatively adjusting said two last-mentioned means, namely the brush-shifting means and the auxiliary voltage varying means to maintain said operating characteristics throughout the sum of said speed ranges, and for this purpose, by shifting the brushes, I preferably continuously maintain the phase of the auxiliary voltage impressed through said brushes to lead in time phase the primary induced voltage by from 0 to 180 electrical degrees to maintain the desired power factor, efficiency and heating and other operating characteristics of the motor.

For a better understanding of the principles involved in my invention, I refer to the following description of illustrative embodiments thereof, as shown by way of example in the accompanying drawings:

Fig. 5 is a longitudinal sectional view through the motor housing and unitary control means I preferably employ for shifting the brushes and for controlling the magnitude of the auxiliary voltage to provide different speed ranges, the rotor and commutator being shown in elevation.

Fig. 6 is a cross sectional view thereof taken along the line 6—6 of Fig. 5.

Fig. 7 is a plan view of a portion of the top of the unitary control means housing showing the connected range slots regulating the action of the unitary control means.

Figure 1:
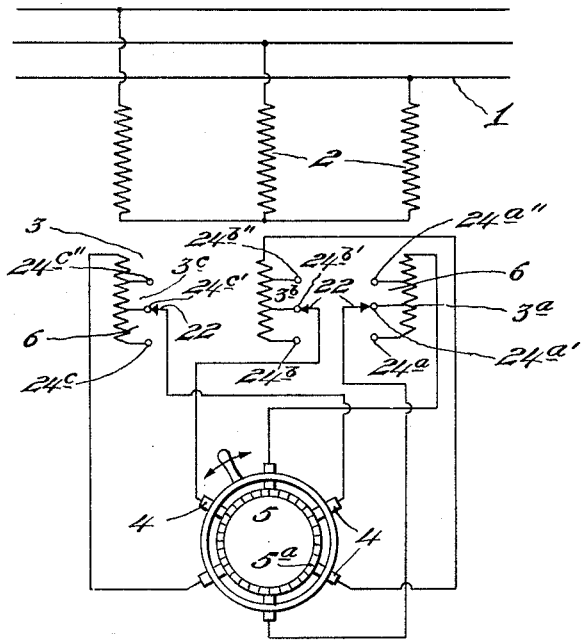
Fig. 1 is a circuit diagram of the motor.

Referring to Fig. 1, I have there shown diagrammatically a motor having the customary three phase stator or primary winding 2 connected to a suitable source of supply 1. There is also on the stator another winding 3, hereinafter referred to as the auxiliary winding, disposed on the stator so as to be inductively coupled to the primary winding. The armature 5 has a winding similar to that of a direct current machine and is provided with a commutator $5^a$ and brushes 4. The brushes are suitably connected to the auxiliary winding 3. The auxiliary winding may be designed to give several voltages to permit a wide adjustment in speed and power factor in a manner which will be explained later.

Figure 2:
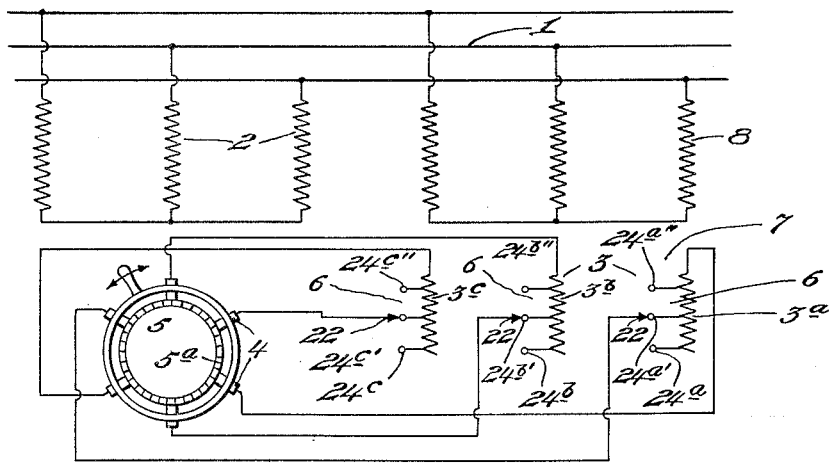
Fig. 2 is a similar diagram of a modified form, showing my improved motor in combination with a transformer.

In the above explanation, the voltage impressed upon the brushes has been taken from the auxiliary winding 3 on the stator but a separate transformer 7 may be alternatively used as shown in Fig. 2, having the voltage in the auxiliary winding 3 induced through the primary winding 8 of the transformer from the main source of power, without changing the results.

Having thus described the essential parts illustrated in Figs. 1 and 2, the method by which I obtain the desired results may be better understood by reference to Fig. 3 which is a vector diagram of the motor operating under load at a particular speed, in this case approximately ten per cent below synchronous. All vectors are shown per phase and rotating in a counter-clockwise direction at a speed dependent upon the frequency of the supply and the number of poles.

For convenience I include a list of symbols used in the vector diagrams.

Figure 3:
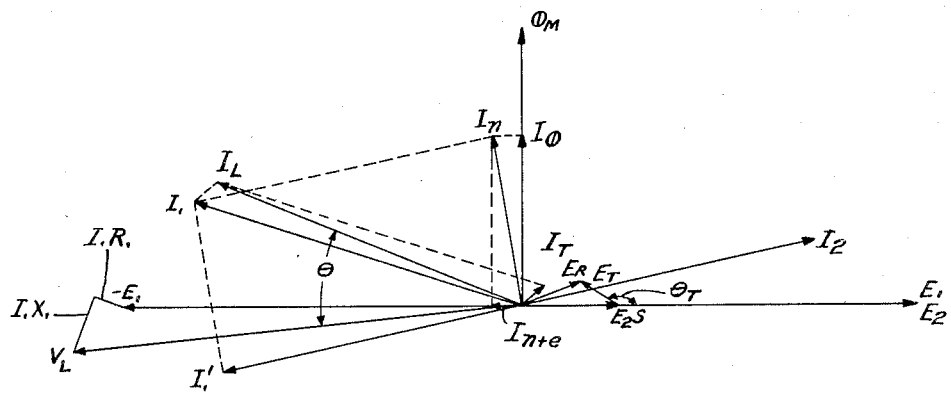
Fig. 3 is a vector diagram showing conditions in the stator and armature of a motor constructed according to the principles of my invention.

$V_L$ = impressed voltage
$\Phi_M$ = flux mutual to stator and armature, caused by $I_\Phi$
$E_1$ = stator primary voltage induced by $\Phi_M$
$E_2$ = armature voltage induced by $\Phi_M$ at standstill
$E_T$ = voltage induced in auxiliary winding by $\Phi_M$ and shifted in phase by the angle of brush shift
$s$ = slip of the armature with respect to stator primary field
$E_2s$ = armature voltage induced by $\Phi_M$ at slip $s$
$E_R$ = resultant armature voltage = $E_T + E_2s$
$I_\Phi$ = magnetizing current producing $\Phi_M$
$I_{h+e}$ = current to supply stator core loss
$I_n$ = exciting current = $I_\Phi + I_{h+e}$
$I_2$ = torque producing current in armature
$I_1'$ = current in stator to neutralize $I_2$
$I_1 = I_1' + I_n$
$I_T$ = current in stator primary to neutralize auxiliary winding current
$I_L$ = line current = $I_1 + I_T$
$I_1R_1$ = stator primary resistance drop
$I_1X_1$ = stator primary reactance drop
$\cos\theta$ = power factor
$\theta_T$ = brush angle of shift Referring to Fig. 3, the phase of $E_T$ with respect to $E_2$ may be adjusted by shifting brushes and with $E_T$ injected as illustrated in Fig. 3, the phase of $E_R$ may be advanced. As $E_R$ sets up the current $I_2$, the phase of $I_2$ will likewise be advanced, improving the power factor of the motor.

Figure 4:
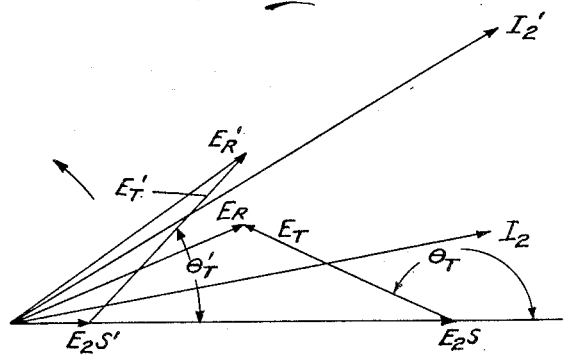
Fig. 4 is a vector diagram of conditions in the armature with the motor operating at two different speeds.

The speed adjustment may be more clearly understood by reference to Fig. 4, which shows how the speed may be changed by shifting the brushes to change the relative phase of the particular injected voltage $E_T$. Symbols without primes represent a low speed condition while symbols with primes are for a higher speed condition. Other speeds may be obtained by shifting the brushes to other positions.

The speed range that may be covered by brush-shifting only depends upon the design of the various parts. A motor has been constructed to give a thirty-five percent speed range while maintaining good efficiency, power factor, and other operating characteristics. By changing the magnitude of the voltage $E_T$ different speed ranges may be obtained by brush shifting so that by using two or more magnitudes of voltage $E_T$, the speed may be controlled over a wide range. The low speed adjustment in this case may be used for starting in place of the customary starting compensator. A three to one speed range has been obtained by using three different values of voltage $E_T$ from three different taps 6 as shown. The brush shifting for any particular voltage should be controlled to give satisfactory characteristics throughout the speed range. It is advisable to use some interlocking arrangement between the brush shifting and the means for adjusting the voltage $E_T$ in order that the changes may take place in the proper sequence.

I have shown in Figs. 5–7 details of a suitable interlocking arrangement to regulate the movement of the unitary control means. As shown in Fig. 5, the armature 5 is rotatably mounted within the stator 10. As shown diagrammatically in Figs. 1 and 2, the three phase stator or the primary winding 2 is mounted within the stator housing 10ª and insofar as the features of the specific control means shown in Figs. 5–7 are concerned, the auxiliary winding 3 may be mounted within the stator housing 10ª as shown in Fig. 1 or mounted within a suitable transformer 7 as shown in Fig. 2. The armature 5 is provided with the usual winding and has projecting from one end thereof the commutator 5ª divided into the usual segments. The brushes 4 are mounted by means of the brush arms 11 to adjustably contact the commutator segments. The armature shaft is extended as at 12 and the housing 10ª is extended as at 13 to provide a bearing 14 projecting inwardly from the end thereof toward said commutator to revolvably receive said armature shaft 12. The brush arms 11 project from a suitable collar 15 which is provided with circumferentially spaced splines 16 projecting axially over said bearing 14. The inner end of the bearing 14 is provided with a circumferential groove 17 to receive a pin 18 projecting radially inwardly from said collar 15 to mount said collar 15 and spline 16 on said bearing 14 against axial movement. A control sleeve 19, provided with suitable grooves 20 therein for receiving said splines 16, is mounted on said bearing 14 and is provided near the outer end thereof with a control handle 21 projecting radially outwardly therefrom through said housing extension 13. The inner end of said control sleeve 19 is provided with spring actuated brushes 22 projecting radially therefrom at spaced circumferential distances. In the embodiment shown, said brushes 22 project from said control sleeve 120° apart and are adapted to contact the respective spaced segments 24ª, 24ᵇ and 24ᶜ arranged circumferentially thereof and each individually electrically connected to its respective coil 3ª, 3ᵇ and 3ᶜ of the induced auxiliary winding 3. The handle 21 is adapted to be adjustable throughout 180 electrical degrees, in the three-phase, four-pole motor shown, through 90 mechanical degrees. It is thus apparent that by adjusting the handle 21 throughout the total circumferential range 25 of the range slots that the brushes will be shifted throughout 180 electrical degrees to vary the phase of the auxiliary voltage impressed on the armature in respect to the primary induced voltage to lead from 0 to 180 electrical degrees in time phase the primary induced voltage to vary the speed in the desired manner, and also to provide a resultant armature voltage continuously leading the primary induced voltage.

To maintain all of said operating characteristics with said changes in speed, I preferably change the auxiliary voltage impressed upon said brushes 4 to provide different speed ranges by shifting said brushes throughout the sum of said speed ranges and to so change the voltage I have divided the slot means 25 into a plurality of overlapping circumferential range slots A, B, C, D and E connected by the axial channels 26, 27, 28 and 29, and I cooperatingly construct a plurality of rings 30, 30' and 30" each containing the plurality of circumferentially spaced insulated conductive segments or contacts 24ª, 24ᵇ, 24ᶜ and 24ª', 24ᵇ', 24ᶜ' and 24ª'', 24ᵇ'' and 24ᶜ'' respectively, to provide the plurality of range rings 30, 30' and 30" with which the respective brushes 22 are contacted on axial movement of the handle 21 through the respective axial connecting slots to slide the brushes into contact with the respective rings 30, 30' and 30''. In the embodiment shown, when the handle 21 is in the slots A and E the brushes 22 are connected to the high voltage taps 24$^a$, 24$^b$ and 24$^c$ making up the ring 30, when the handle is in the slots B and D the brushes 22 are connected to the medium voltage taps 24$^{a'}$, 24$^{b'}$ and 24$^{c'}$ making up the medium voltage ring 30', and when the handle is in the elongated slot C, the brushes 22 are connected to the low voltage taps 24$^{a''}$, 24$^{b''}$ and 24$^{c''}$ making up the low voltage ring 30''. Thus, for example, the possible speed ranges might be the following:

| Slots | R. P. M. |
|---|---|
| A | 800-1000 |
| B | 1000-1300 |
| C | 1300-1900 |
| D | 1900-2200 |
| E | 2200-2400 |

By reference to the vector diagram, it will be apparent that to maintain suitable operating characteristics, the angles $E_R$ and $E_R'$ with respect to $E_2S$ and $E_2S'$ should be maintained fairly acute because it is desirable that the torque producing current in the armature $I_2$ should not advance in phase too much over $E_1$ although a slight increase is desirable to maintain the proper power factor, and should not increase too much in magnitude to cause an excessive heating and lack of efficiency in the motor. It is to prevent this increase in magnitude of $I_2$ that I step the voltage to its lowest magnitude in the C range and to an intermediate magnitude in the ranges B and D.

In the apparatus shown, in shifting from A to B and from B to C, it is apparent that the R. P. M. for the same brush position will be greater at the lower voltage and for this reason the slots B and C are extended circumferentially beyond the interconnecting slots 26 and 27 and vice versa for slots 28 and 29.

I am aware that the invention may be embodied in other specific forms without departing from the spirit or essential attributes thereof, and I therefore desire the present embodiments to be considered in all respects as illustrative and not restrictive; reference being had to the appended claims rather than to the foregoing description to indicate the scope of the invention.

What I claim is:

1. In combination, an alternating current motor operable from a main source of power, having a stator having a primary winding connected to said main source of power, a commutated armature and a set of brushes for said commutated armature, an auxiliary winding magnetically coupled with said main source of power and connected to said brushes and provided with taps, means for changing the auxiliary voltage impressed upon said brushes from said auxiliary winding by tap changing to provide different speed ranges, means for shifting said brushes to adjust speed within each range and unitary control means for adjusting said last two mentioned means capable of providing any particular speed within the speed range of said motor.

2. In combination, an alternating current motor operable from a main source of power, having a stator having a primary winding connected to said main source of power, a commutated armature and a set of brushes for said commutated armature, an auxiliary winding magnetically coupled with said main source of power and connected to said brushes and provided with taps, means for changing the auxiliary voltage impressed upon said brushes from said auxiliary winding by tap changing to provide different speed ranges, means for shifting said brushes to adjust speed within each range and unitary control means for adjusting said last two mentioned means capable of providing any particular speed within the speed range of said motor, movable axially of said armature shaft for tap changing for said different speed ranges and movable circumferentially of said shaft for shifting said brushes to adjust speed within each range.

3. In combination, an alternating current motor operable from a main source of power, having a stator having a primary winding connected to said main source of power, a commutated armature having a shaft and a set of brushes for said commutated armature, an auxiliary winding magnetically coupled with said main source of power and connected to said brushes and provided with taps, means for changing the auxiliary voltage impressed upon said brushes from said auxiliary winding by tap changing to provide different speed ranges, means for shifting said brushes to adjust speed within each range and unitary control means for adjusting said last two mentioned means having a single operating handle axially and circumferentially movably mounted relative to said armature shaft and a casing surrounding said shaft having a plurality of spaced overlappingly staggered circumferential range slots and axial channels connecting said range slots at points so spaced from the ends thereof that said handle may be moved axially of said armature shaft from one range slot to another for tap changing for different speed ranges and may be moved circumferentially of said armature shaft for shifting said brushes to adjust speed within each range to provide any particular speed within the speed range of the motor.

AUSTIN S. NORCROSS.